United States Patent
Yabata et al.

(10) Patent No.: US 6,273,593 B1
(45) Date of Patent: Aug. 14, 2001

(54) DOOR AND MANUALLY ACTUATED VEHICLE INTERIOR LIGHTING SYSTEM

(75) Inventors: Hiroshi Yabata; Kouji Mikami, both of Tokyo (JP)

(73) Assignee: Kabushiki Kaisha T an T, Tokyo (JP)

(*) Notice: Subject to any disclaimer, the term of this patent is extended or adjusted under 35 U.S.C. 154(b) by 0 days.

(21) Appl. No.: 09/386,840

(22) Filed: Aug. 31, 1999

(30) Foreign Application Priority Data

Jun. 9, 1999 (JP) .................................................. 11-161944

(51) Int. Cl.$^7$ ....................................................... B60Q 1/00
(52) U.S. Cl. .......................... 362/488; 362/487; 362/490; 362/543; 362/544
(58) Field of Search .................................. 362/487, 488, 362/490, 543, 544, 360, 237

(56) References Cited

U.S. PATENT DOCUMENTS 6,092,917 * 7/2000 Litke et al. .......................... 362/490

\* cited by examiner

Primary Examiner—Sandra O'Shea
Assistant Examiner—Ismael Negron

(74) Attorney, Agent, or Firm—Nixon & Vanderhye P.C.

(57) ABSTRACT

Automotive lighting systems include a casing which defines an interior space and a pair of shafts extending thereacross so as to establish adjacent first and second interior space regions. Lamps are positioned in respective ones of these adjacent first and second interior space regions and are covered by a respective pair of lenses. Each lens has proximal and distal ends and is connected pivotally at the proximal end thereof to a respective one of the shafts to allow for independent pivotal movements of the distal end between inoperative and operative positions. Push switches are operatively connected to respective ones of the lamps and positioned in respective ones of the first and second interior space regions in such a manner that the distal ends of each lens is in contact with a respective push switch. In such a manner, the push switches may be operated in response to the pivotal movements of the lenses between its inoperative and operative positions to thereby illuminate the lamps. Most preferably, the pair of shafts are positioned closely adjacent one another and extend across the casing at generally a central position thereof such that the proximal ends of the lenses are immediately adjacent one another with the lenses extending in opposite directions toward the distal ends thereof. The automotive lighting systems may be provided as a component part of a door switch circuit which responsively operates the lamps on opening of an automotive door.

3 Claims, 5 Drawing Sheets

DOOR AND MANUALLY ACTUATED VEHICLE INTERIOR LIGHTING SYSTEM

BACKGROUND OF THE INVENTION

The present invention relates to an automotive lighting system attached to a forward inner part of the roof of a car to insure that two illumination lamps are turned on and off when a door is opened and closed and that two map lamp switches are lighted by way of lens plates to selectively turn on a driver's seat side lamp or a front passenger's seat side lamp to act as map lamps, respectively.

Now, a conventional automotive lighting system in general use will be explained hereinafter.

As an automotive lighting system equipped with map lamps, there are two types. In one of said two types, an internal illumination lamp turned on or off by a door open/close operation and a map lamp turned on or off by an on-and-off operation of a switch are accommodated in different housings. In the other type, said internal illumination lamp and said map lamp are accommodated in a single housing.

In the former type, the internal illumination lamp is mounted centrally to the roof inside of the car while a map lamp is mounted centrally to the forward inner part of the roof. Then, the internal illumination lamp is turned on and off in response to the door open/close operation. It is also possible, to set the switch such that the lamp is adapted to be turned on or off irrespective of the door open/close operation. Said map lamp is turned on and off by the operation of a switch mounted to the housing of said lamp.

Conventionally, the internal illumination lamp and the map lamp are assembled into a single housing, in which there are provided different switches to turn on and off said internal illumination lamp and said map lamp. In this case, the knob to operate such switch is needed with the result that the housing is required to be large-sized.

In order to downsize the housing, the area of the lens must be small and on the other hand, the size of the housing must be large if the lens is required to have a large size. However, if the lens plate is to be downsized, a problem of having an illumination luminance reduced and if the size of the lens plate is required to be large, the space taken up at the roof of the housing is so large that there arises a problem in terms of designing preference.

Further, said two types of conventional automotive lighting systems employ different lamps for illumination within the housing and for the purpose of reading maps. In compliance thereto, there are three lamps including two map lamps each for the driver's seat and the front passenger's seat and one lamp for illumination inside of the car. Similarly, there are three switches including one for turning on and off the internal illumination lamp and two others for the respective map lams. Therefore, the need for a large housing is involved for map lamp switches and map lamps themselves with the result that the cost incurred tends to be higher.

The present invention is aimed at solving the problems stated above and the object of the present invention is to provide an automotive lighting system which is capable of downsizing the housing while using a lens of a size large as compared to the housing by using an internal illumination lamp and map lamps, by substituting lens plates for a switching knob for turning on and off the lamps while providing designing novelty.

The present invention is to accomplish said object and means therefor includes a pair of lamps accommodated within a housing, a push switch to control turning on-and-off operations of the switch mounted to opposite inside ends of the housing; and a pair of lens plates pivotally supported centrally at an opening in said housing to allow a swing movement, the back of said lens plates at opposite ends thereof being formed to be abutted by an actuating button to operate said push switch such that said push switch performs the turn-on/turn-off operation separately for said pair of lamps.

Further, it is preferable that said lamps are connected to door switches in a circuit design such that said pair of lamps are both lighted by said door being opened.

DESCRIPTION OF PREFERRED EMBODIMENTS

Hereinafter, one embodiment of the invention relating to an automotive internal lamp will be explained with reference to the drawings.

Figure 1:
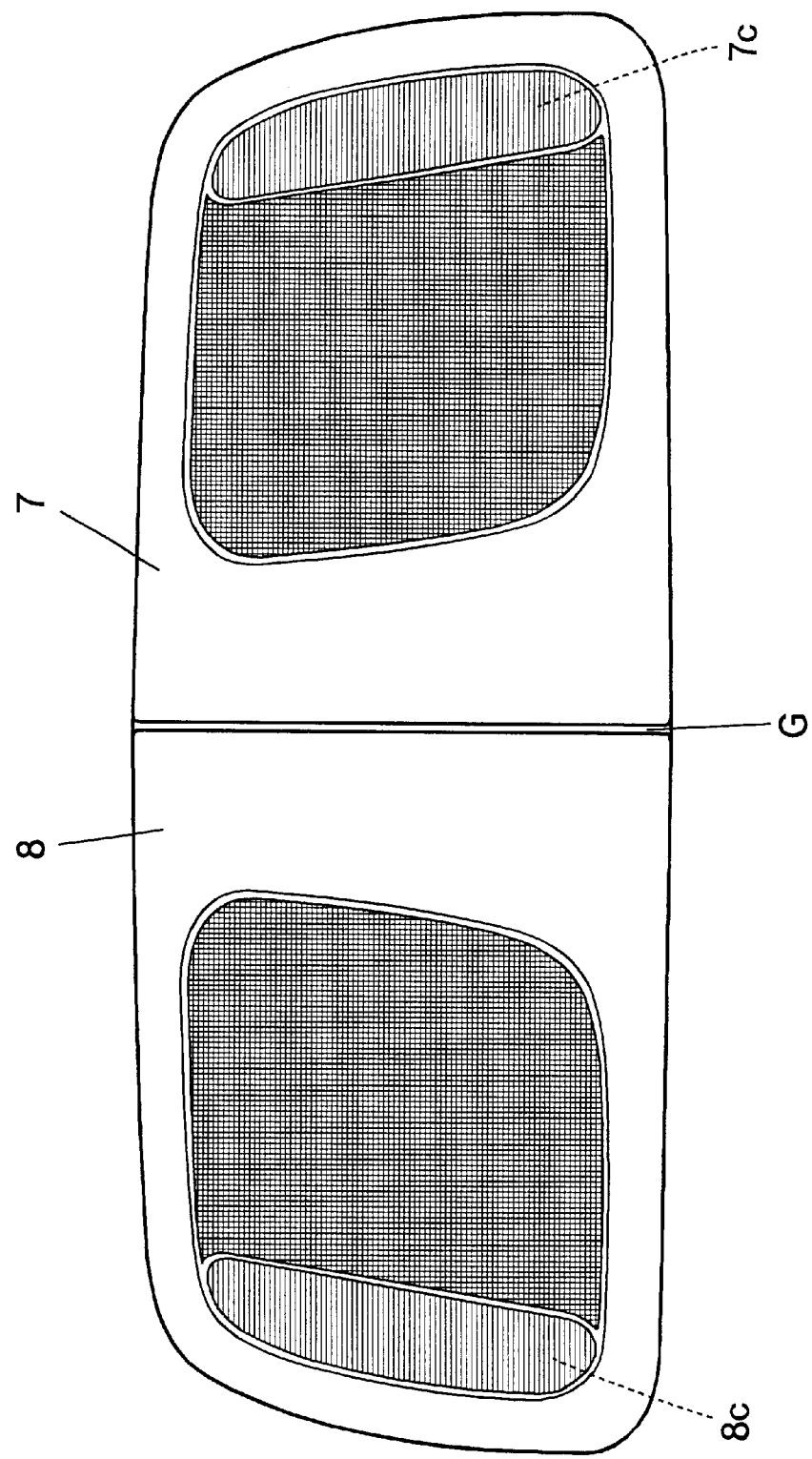
FIG. 1 is a front view of one embodiment of the present invention relating to an automotive lighting system.
Figure 2:
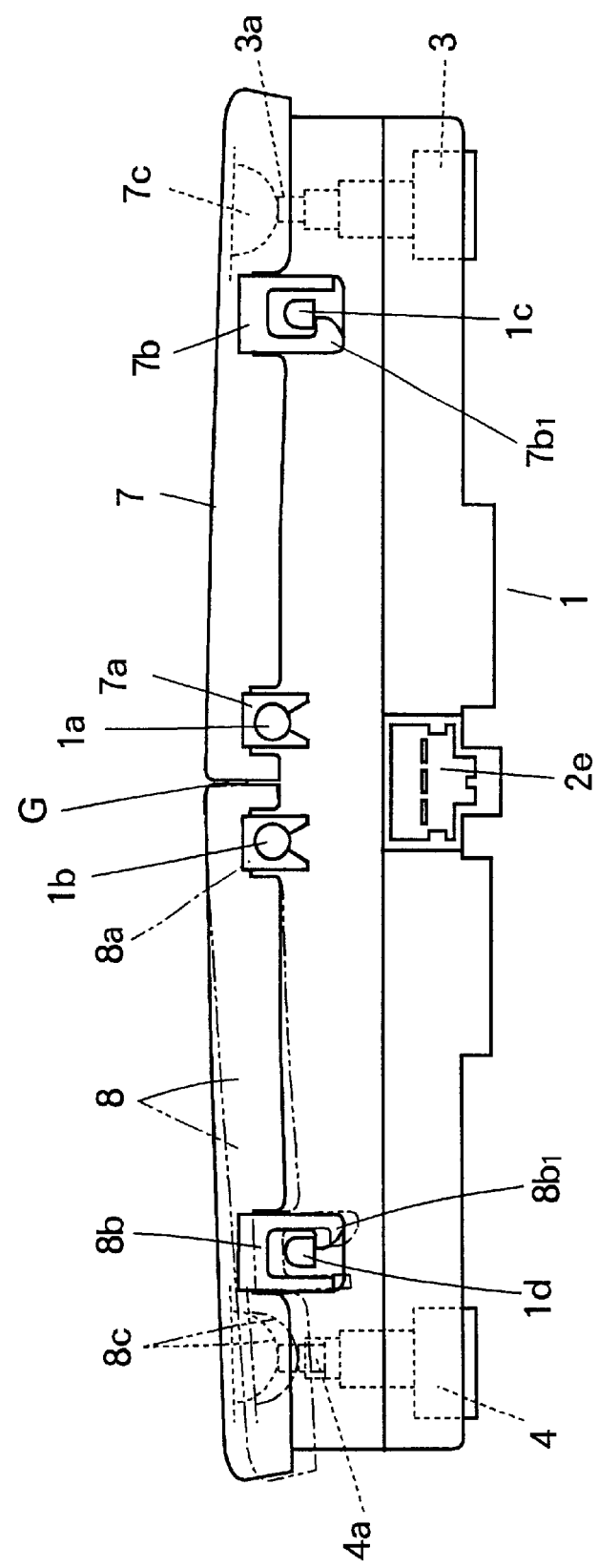
FIG. 2 is a side elevation of FIG. 1.
Figure 3:
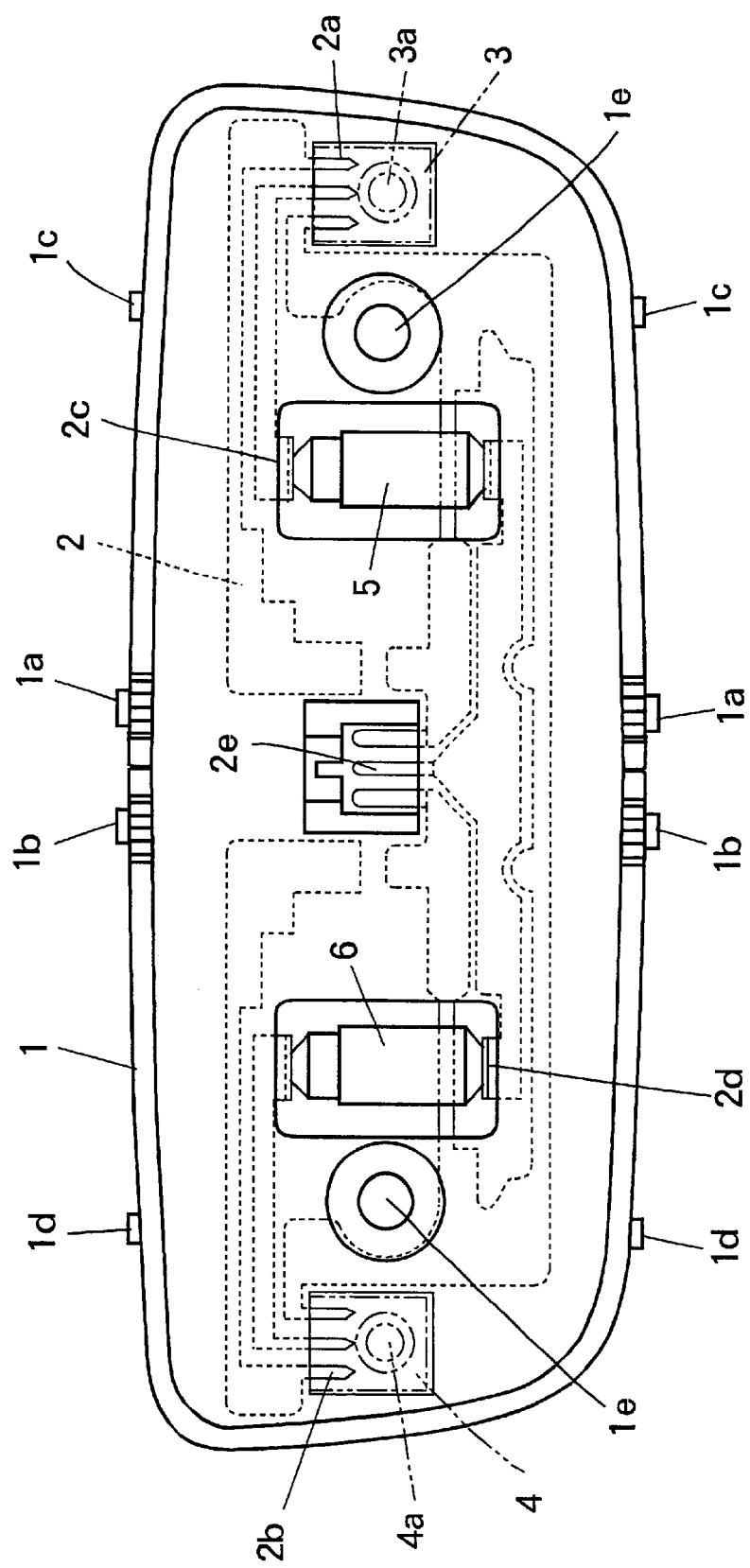
FIG. 3 is a front view of the state in which the lens plates shown in FIG. 1 are removed.
Figure 4:
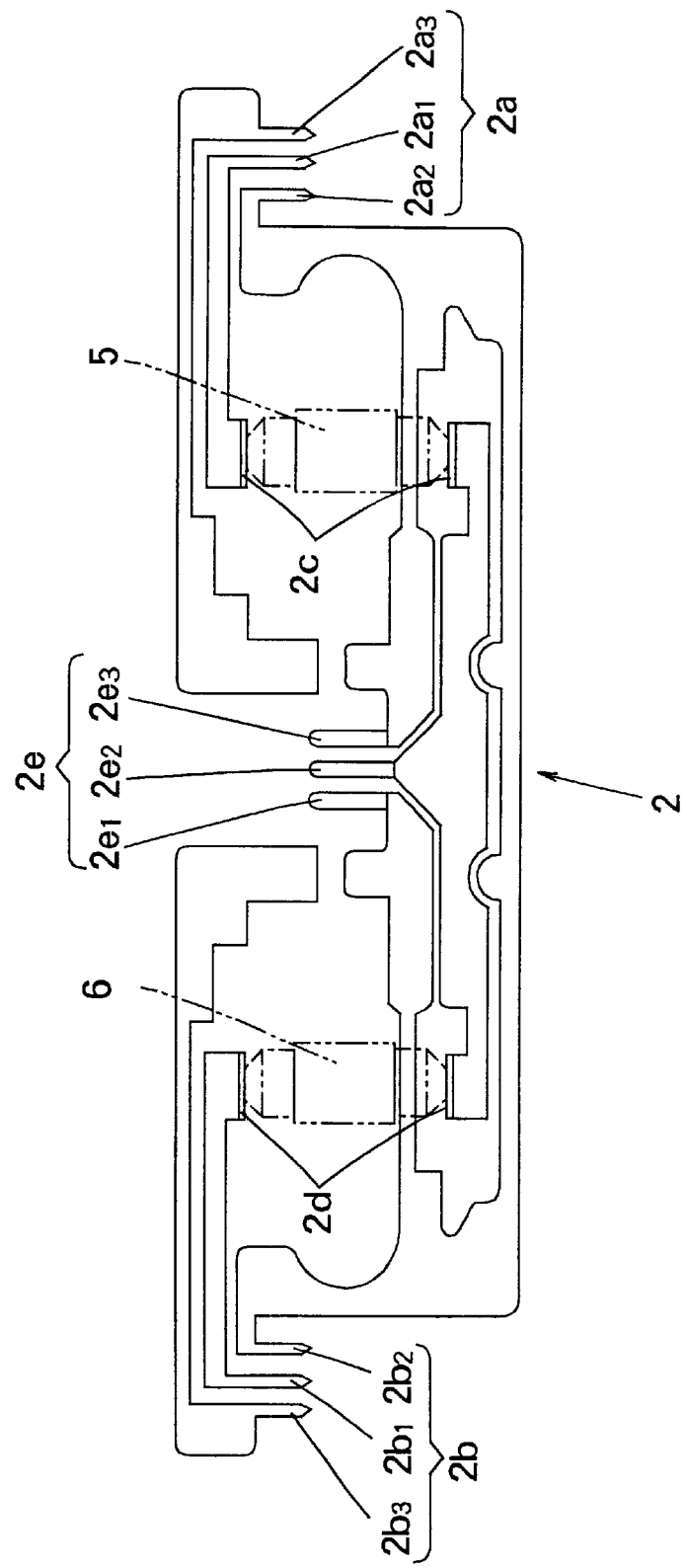
FIG. 4 is a front view of a bus bar to be molded in said housing.

Referring to FIGS. 1 through 3, the numeral 1 denotes a casing and there is symmetrically arranged molded bus bars 2 on both sides of a longitudinal centerline of said casing 1. (See FIG.4).

Push switches 3 and 4 (hereinafter, simply referred to as switches) are accommodated within said casing 1 to be connected to left and right terminals of said bus bars 2 such that actuator buttons 3a and 4a jut out against the backsides of lenses 7 and 8 which will be explained later. The numerals 5 and 6 denote lamps, respectively, resiliently held against erected pieces 2c and 2d cut out from said bus bars.

Figure 5:
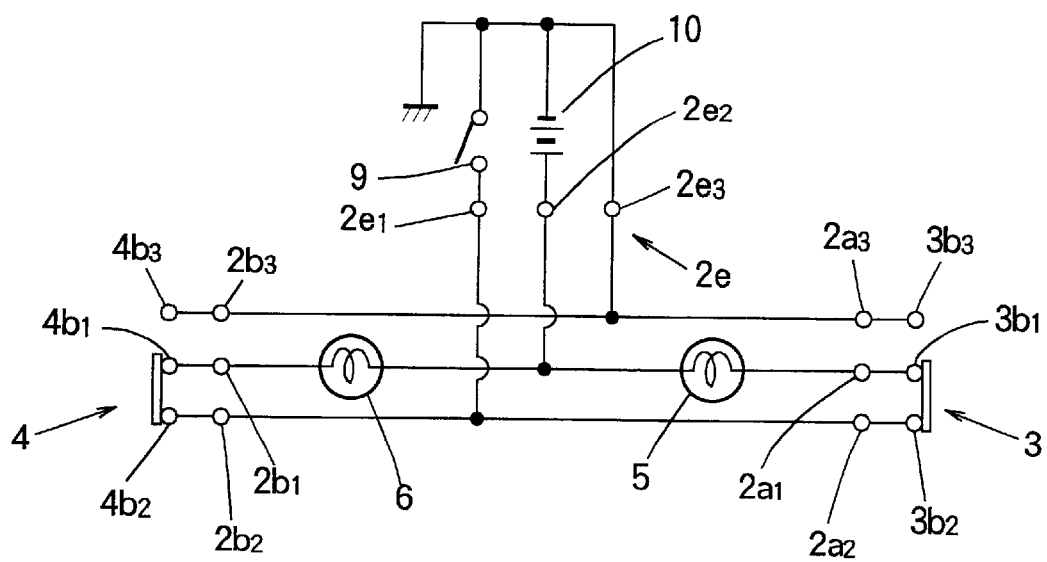
FIG. 5 is a circuit structure completed by said bus bars of FIG. 4.

In this connection, terminals 2e formed at the center of the bus bars 2 are for providing connections between an automotive battery, door switches to perform on-and-off actions at the time of opening and closing the doors and the earth terminal. FIG. 5 shows a lamp lighting circuit composed of the bus bars 2, the switches 3 and 4, and the lamps 5 and 6. Detailed circuit actions will be explained later on.

The numerals 7 and 8 denote a pair of lens plates sized to cover the front of the casing 1. At the portions close to the center of the opposite side faces of the respective lens plates 7 and 8, there are formed bearing sections 7a and 8a to pivotally support fulcrum shafts 1a and 1b formed to project from portions close to the center of the opposite side faces.

Further, at the portions close to the distal ends of said opposite side faces of the respective lens plates 7 and 8. there are formed engagement sections 7b and 8b having hooks $7b_1$ and $8b_1$ adapted to move freely relative to fixed shafts 1c and 1d jutting from the ends of said opposite side faces of said casing 1, said engagement sections 7b and 8b being formed with hooks 7b1 and $8b_1$ to prevent the engagement sections 7b and 8b from slipping out off said fixed shafts 1c and 1d.

Further, the back faces of said lens plates 7 and 8 are formed with protuberances 7c and 8c at positions opposite the actuator buttons 3a and 4a of said switches 3 and 4.

Therefore, the portions close to the engagement sections 7b and 8b of the respective lens plates 7 and 8 are pushed upward with the bearing sections 7a and 8a as fulcrums under the urge of springs acting on the actuator buttons 3a and 4a.

In this connection, there is formed a slight gap G between said two lens plates 7 and 8 to allow for swing actions thereof, respectively. There are further screw holes 1e for the securing of the same onto the forward portion of the internal vehicle roof.

Next, a lamp lighting circuit will be explained with reference to FIG. 5. In this connection, similar numbers and similar characters are omitted because they denote similar members.

Right-hand terminals 2a and left-hand terminals 2b shown in FIGS. 2 and 3 are connected to switches 3 and 4 as shown in FIG. 5. Then, while the mobile contact plates adapted to be moved by actuator buttons 3a and 4a are kept from pressing down the actuator buttons 3a and 4a, connections are provided between the contacts $3b_1$ and $3b_2$ as well as between the contacts $4b_1$ and $4b_2$, respectively. On the other hand, while said plates press down said actuator buttons 3a and 4a, connections are provided between the contacts $3b_1$ and $3b_3$ as well as between the contacts $4b_1$ and $4b_3$.

On the other hand, while the terminal $2e_1$ in the terminal section 2e is connected to the earth terminal by way of the door switch 9 which is turned on at the time of door opening, the terminal $2e_2$ is connected to the plus terminal of the automobile battery 10 and the terminal $2e_3$ to the earth terminal, respectively.

Next, the operation on the basis of said circuit will be explained. When a door is opened with the actuator buttons 3a and 4a being kept from being pressed down as shown, the door switch 9 is closed such that a current from the + terminal of the battery 10 bifurcates to flow respectively through the lamps 5 and 6, the respective bifurcated currents flow through switches 3 and 4 by way of the door switch 9 for grounding. Thus, the two lamps 5 and 6 are lighted to illuminate the inside of the vehicle.

When the door is closed to open the door switch 9 as shown, the actuator button 3a is pressed down as a result of the end portions of the lens plate 7 being pressed down such that the contacts $3b_1$ of the switch 3 comes into contact with the contact $3b_3$ thus allowing the current from the +terminal of the battery 10 to flow through the lamp 5 and switch 3 before grounding. As a result, the lamp 5 is lighted to act as a drivers seat map lamp.

Now, apart from the switching operation of the switch 3, the end portion of the lens plate 8 on the front passenger seat side is pressed down such that the contacts $4b_1$ and $4b_3$ are brought into contact with each other, thus allowing the current from the +terminal to flow through the lamp 6 and the switch 4 before grounding. As a result, the lamp 6 is lighted to act as a drivers seat map lamp.

As detailed in the foregoing, a pair of push switches are electrically connected to a pair of lamps in correspondence and a pair of lens plates to transmit magnified lights from said lamps are turned on and off by said push switch, thus substituting the lens plates for a switching knob to light the lamp. As a result, it is possible to manufacture an automotive lighting system providing the appearance of designing novelty while the downsizing of the housing is realized.

Further, said lamps are connected to the door switch of a design such that said pair of lamps are lighted by the door opening. As a result, the two lamps may be used as an illumination lamp and a map lamp such that a small number of lamps are provided for common use to realize the downsizing and the cost reduction.

What is claimed is:

1. An automotive lighting system comprising:

a casing which defines adjacent first and second interior space regions;

a pair of lamps positioned in respective ones of said adjacent first and second interior space regions;

first and second lenses covering respective ones of said adjacent first and second interior space regions, each of said first and second lenses having proximal and distal ends, and being positioned relative to one another so that said proximal ends thereof are adjacent to one another generally at a central region of said casing and said distal ends thereof are positioned remotely from one another near respective lateral regions of said casing, mounting assemblies for respectively mounting each one of said first and second lenses to said casing for independent operable movements with respect to the other of said first and second lenses, wherein said each of said mounting assemblies include;

(1) opposed pairs of fulcrum shafts projecting from respective opposed sides of said casing near said central region thereof, (2) pairs of bearing sections formed at said proximal ends of said first and second lenses for engagement with a respective one of said pairs of fulcrum shafts to allow for pivotal movements thereabout;

(3) opposed pairs of fixed shafts spaced from said fulcrum shafts and projecting from said opposed sides of said casing near said distal ends of said first and second lenses; and (4) pairs of engagement sections each having hooks for engagement with respective ones of said fixed shafts so as to allow said distal ends of said first and second lenses to be moved towards and away from said casing in response to pivotal movements of said proximal ends thereof about said fulcrum shafts; and wherein said system further comprises, a pair of push switches operatively connected to said respective ones of said lamps and positioned in respective ones of said first and second regions of said interior space such that each of said distal ends of said first and second lenses is in contact with a respective one of said push switches so as to allow said respective one of said push switches to be operated in response to a respective one of said distal ends of said first and second lenses being moved towards said casing when pivoted about said fulcrum shafts to thereby illuminate said lamp operatively connected thereto.

2. The automotive lighting system of claim 1, which further comprises a door switch which operates on opening of an automotive door, and a switch circuit operatively connected to said lamps to allow said lamps to illuminate in response to said opening of said automotive door.

3. The automotive lighting system of claim 1, wherein said lenses include a protuberance formed at said distal end thereof to contact said respective one of said push switches.

* * * * *